United States Patent
Hoppe et al.

(10) Patent No.: US 10,611,916 B2
(45) Date of Patent: Apr. 7, 2020

(54) HIGH WET FAST BRILLIANT BLUE DISPERSE DYE MIXTURES

(71) Applicant: DyStar Colours Distribution GmbH, Raunheim (DE)

(72) Inventors: Manfred Hoppe, Kürten (DE); Clemens Grund, Hattersheim (DE); Fanny Vermandel, Eppstein (DE); Werner Tißen, Odenthal (DE)

(73) Assignee: DyStar Colours Distribution GmbH (DE)

( * ) Notice: Subject to any disclaimer, the term of this patent is extended or adjusted under 35 U.S.C. 154(b) by 0 days.

(21) Appl. No.: 15/532,813

(22) PCT Filed: Nov. 16, 2016

(86) PCT No.: PCT/EP2016/077798
§ 371 (c)(1),
(2) Date: Jun. 2, 2017

(87) PCT Pub. No.: WO2017/097554
PCT Pub. Date: Jun. 15, 2017

(65) Prior Publication Data
US 2018/0273762 A1 Sep. 27, 2018

(30) Foreign Application Priority Data

Dec. 10, 2015 (EP) ..................... 15199282

(51) Int. Cl.
| | |
|---|---|
| C09B 67/00 | (2006.01) |
| C09D 11/328 | (2014.01) |
| D06P 1/19 | (2006.01) |
| D06P 1/16 | (2006.01) |
| D06P 3/54 | (2006.01) |
| D06P 1/18 | (2006.01) |
| D06P 3/52 | (2006.01) |
| C09B 67/22 | (2006.01) |

(52) U.S. Cl.
CPC ...... C09B 67/0051 (2013.01); C09B 67/0041 (2013.01); C09D 11/328 (2013.01); D06P 1/16 (2013.01); D06P 1/18 (2013.01); D06P 1/19 (2013.01); D06P 3/52 (2013.01); D06P 3/54 (2013.01)

(58) Field of Classification Search
CPC ............ C09B 67/0041; C09B 67/0051; C09D 11/328; D06P 3/52; D06P 3/54; D06P 1/16; D06P 1/18; D06P 1/19
See application file for complete search history.

(56) References Cited

U.S. PATENT DOCUMENTS

| | | | |
|---|---|---|---|
| 4,348,319 A | 9/1982 | Hamprecht | |
| 4,681,932 A | 7/1987 | Kruckenberg et al. | |
| 5,376,150 A * | 12/1994 | Lange | B41M 5/3856 503/227 |
| 5,389,596 A | 2/1995 | Etzbach et al. | |
| 5,853,432 A * | 12/1998 | Etzbach | B41M 5/3858 8/643 |
| 5,910,624 A | 6/1999 | Wanken et al. | |
| 7,824,450 B2 * | 11/2010 | Jordan | C09B 29/0059 8/464 |

FOREIGN PATENT DOCUMENTS

| | | |
|---|---|---|
| DE | 2623251 A1 | 12/1976 |
| DE | 2610675 A1 | 9/1977 |
| DE | 2936489 A1 | 3/1980 |

(Continued)

OTHER PUBLICATIONS

International Search Report for PCT/EP2016/077798 dated Jan. 31, 2017.

(Continued)

*Primary Examiner* — Amina S Khan
(74) *Attorney, Agent, or Firm* — Faegre Drinker Biddle & Reath LLP

(57) ABSTRACT

The present invention is directed to high wet fast brilliant blue disperse dye mixtures comprising dye(s) of formula (I)

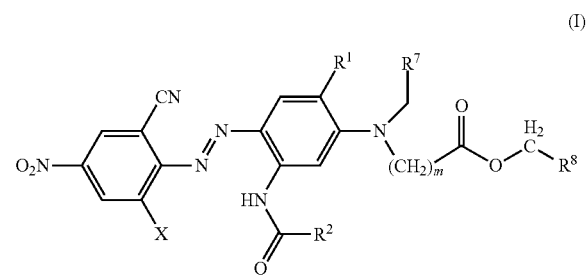

and of formula (II)

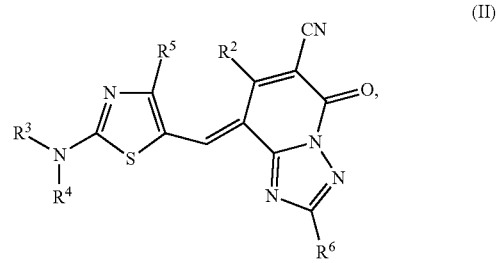

their production and their use for textile dyeing and printing.

1 Claim, No Drawings

(56) References Cited

FOREIGN PATENT DOCUMENTS

| | | |
|---|---|---|
| DE | 3004655 A1 | 8/1981 |
| DE | 4403083 A1 | 8/1995 |
| EP | 0167913 A2 | 1/1986 |
| EP | 0167919 A2 | 1/1986 |
| EP | 0569785 A1 | 11/1993 |
| EP | 0591736 A2 | 4/1994 |
| EP | 0763571 A1 | 3/1997 |
| EP | 0827988 A1 | 3/1998 |
| EP | 2113011 A2 | 11/2009 |
| EP | 7821369 | 11/2009 |
| GB | 1535334 A | 12/1978 |
| JP | S51150530 A | 12/1976 |
| JP | S58038754 A | 3/1983 |
| JP | H1121465 A | 1/1999 |
| WO | WO-9521219 A1 | 8/1995 |
| WO | WO-2008049758 A2 | 5/2008 |
| WO | WO 2012095284 * 7/2012 ............. C09B 67/22 |
| ZA | 7904964 B | 5/1981 |

OTHER PUBLICATIONS

Written Opinion of the International Searching Authority for PCT/EP2016/077798 dated Jan. 31, 2017.
"Disperse Dye Composition Fibre Polymide Polycarbonate Comprise One Compound Azo Methine", WPI Accession No. 1999-163350, Jan. 26, 1999.

* cited by examiner

HIGH WET FAST BRILLIANT BLUE DISPERSE DYE MIXTURES

CROSS-REFERENCE TO RELATED APPLICATIONS

This application is a national stage application (under 35 U.S.C. § 371) of PCT/EP2016/077798, filed Nov. 16, 2016, which claims benefit of European Application No. 15199282.3, filed Dec. 10, 2015, both of which are incorporated herein by reference in their entirety.

This invention relates to high wet fast disperse dye mixtures with brilliant blue and greenish blue shades.

Disperse dyes and their use for dyeing polyester and its blends with other fibres such as for example cellulose, Elastane/Spandex, nylon and wool by normal exhaust dyeing, continuous dyeing and direct printing techniques are already known from e.g. DE 30 04 655, EP 0 827 988, EP0167919 or DE 26 23 251.

They have, however, certain application defects, such as for example an insufficient colour build-up on polyester (good colour build-up results from the ability of a dye to provide a proportionally stronger dyeing when used in higher concentrations in the dye bath), or unsatisfactory fastness properties, especially wet fastness.

In addition, there are limitations in the brilliant blue/greenish blue shade area as the "standard chromphor" Phthalocyanine, which is used widely on other fibres, cannot be applied on Polyester due to its very low affinity to the fibre. Anthraquinone dyes, also used in this shade area, do not deliver sufficient wet fastness properties.

Thus there is a need for disperse dyes which provide dyeing's of improved colour depth and good fastness properties of dyed polyester or its blends with other fibres such as cellulose, nylon and wool in the brilliant blue, greenish blue shade area.

The present invention thus is directed to a dye mixture comprising one or more dye(s) formula (I)

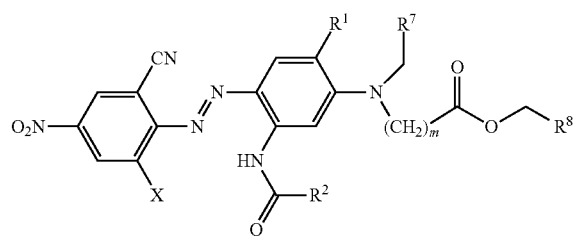

(I)

and one or more dye(s) of formula (II)

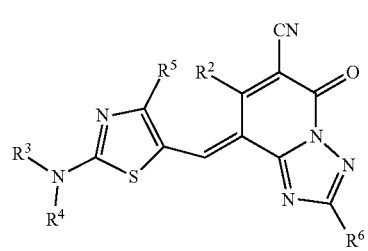

(II)

and optionally one or more dye(s) of formula (III) and/or one or more dye(s) of formula (IV)

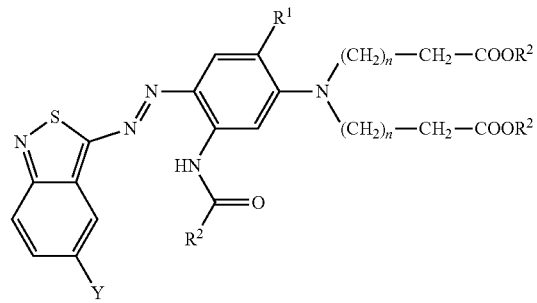

(III)

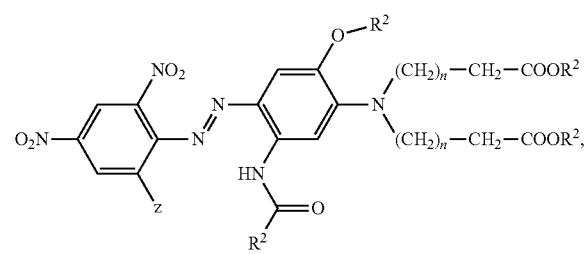

(IV)

wherein independently from each other $R^1$ is hydrogen, $(C_1-C_4)$-alkyl or $(C_1-C_4)$-alkoxy, $R^2$ is $(C_1-C_4)$-alkyl, $R^3$ and $R^4$ is $(C_2-C_8)$-alkyl, $R^5$ is phenyl or methyl, $R^6$ is $(C_4-C_{10})$-alkyl, preferably branched $(C_4-C_{10})$-alkyl, $R^7$ is methyl, ethyl or phenyl, $R^8$ is methyl or —CO—$R^2$, X is $NO_2$ or CN, Y is $NO_2$ or CN, Z is halogen, n is 0, 1 or 2 and m is 1 or 2.

In general a dye mixture as described above is preferred, wherein at least one dye of formula (IV) is present is preferred.

Also preferred is a dye mixture comprising one or more dye(s) of formula (I)

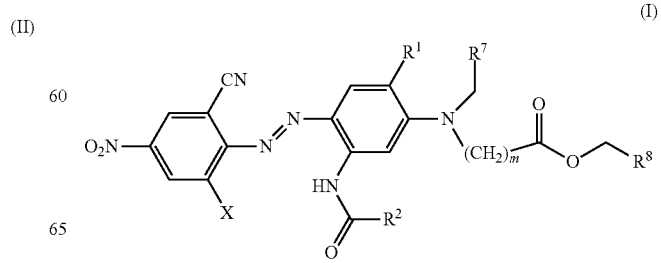

(I)

and one or more dye(s) of formula (II)

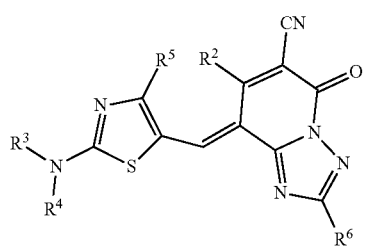

and optionally
one or more dye(s) of formula (III) and/or one or more dye(s) of formula (IV)

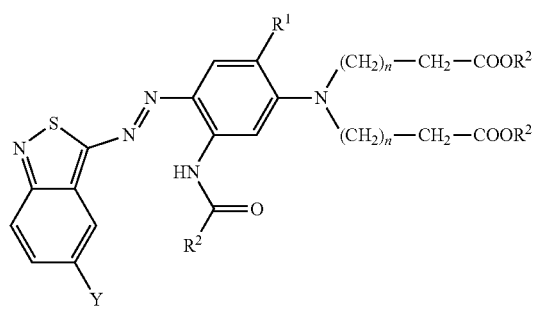

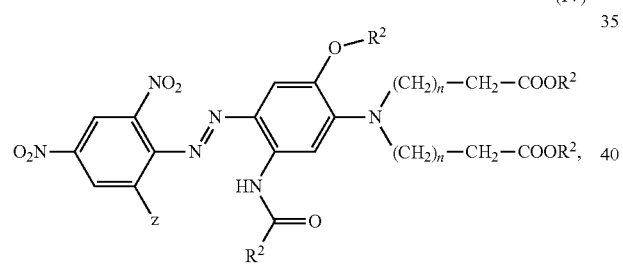

wherein independently from each other $R^1$ is hydrogen, $(C_1$-$C_2)$-alkyl or $(C_1$-$C_2)$-alkoxy, $R^2$ is $(C_1$-$C_2)$-alkyl, $R^3$ and $R^4$ is $(C_3$-$C_5)$ alkyl, $R^5$ is phenyl, $R^6$ is $(C_6$-$C_8)$-alkyl, preferably branched $(C_6$-$C_8)$-alkyl, $R^7$ is methyl or phenyl, $R^8$ is hydrogen, methyl or —CO—$R^2$, X is $NO_2$ or CN, Y is $NO_2$, z is Cl or Br, n is 0 or 1 and m is 1 or 2.

Also for the dyes of formula (I) to (IV) there exist preferred ones as is outlined below and partly based on those also preferred mixtures, as is outlined further below.

A dye mixture is preferred, wherein the one or more dye(s) of formula (I) is/are selected from the group consisting of:

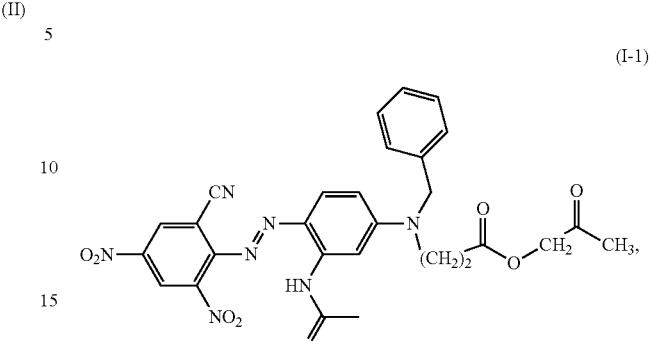

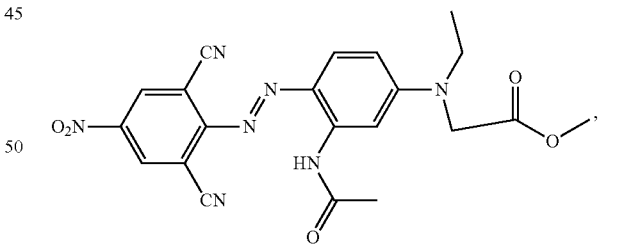

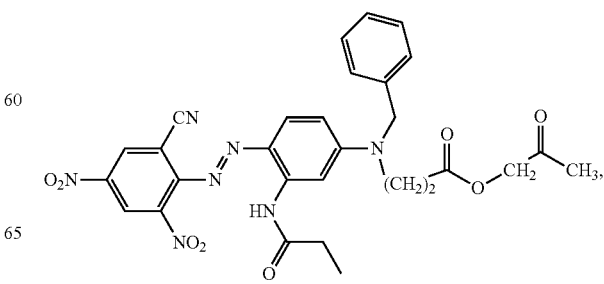

-continued (I-6)
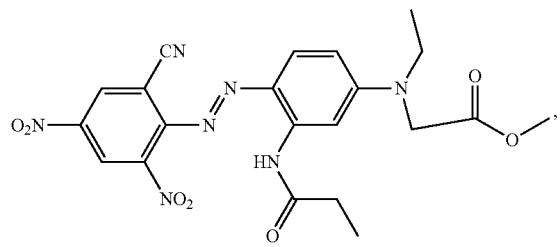

(I-7)
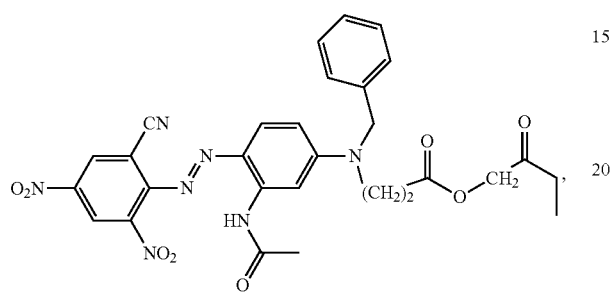

(I-8)
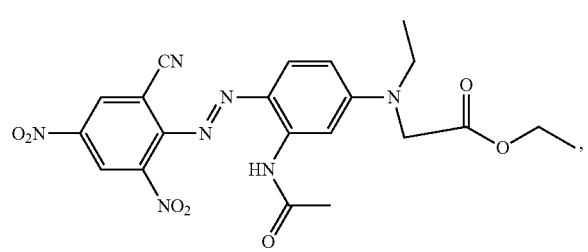

(I-9)
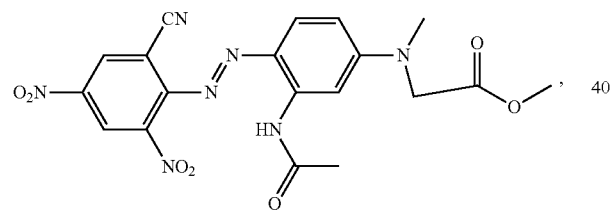

(I-10)
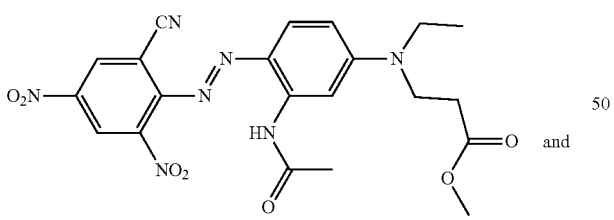
and (I-11)
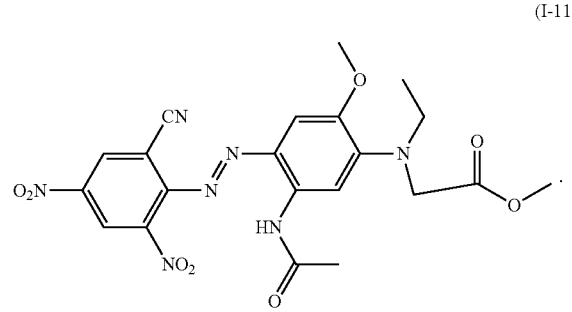

Even more preferred is a dye mixture, wherein the dye of structure is selected from the group consisting of: I-1, I-2 and I-11.

A dye mixture is preferred, wherein the one or more dye(s) of formula (II) is/are selected from the group consisting of:

(II-1), (II-2) and (II-3)
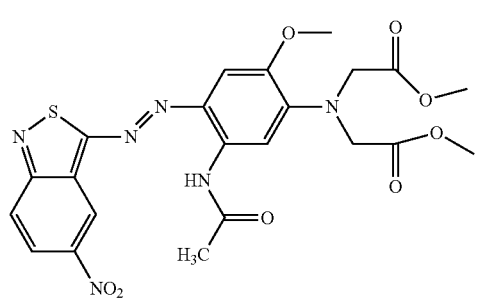

Particularly preferred is a dye mixture, wherein the dye of general structure (II) is II-1.

A dye mixture is preferred, wherein at least one dye of formula (III) is present and wherein the one or more dye(s) of formula (III) is/are selected from the group consisting of:

(III-1)

(III-2)
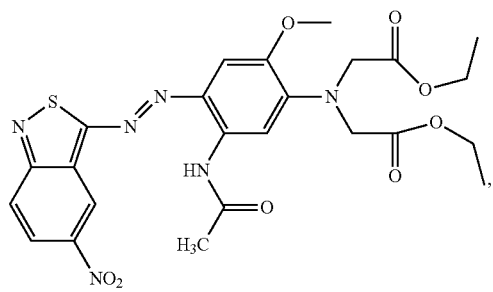
(III-3)
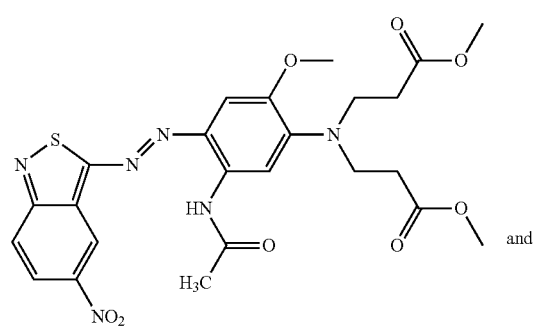
and
(III-4)
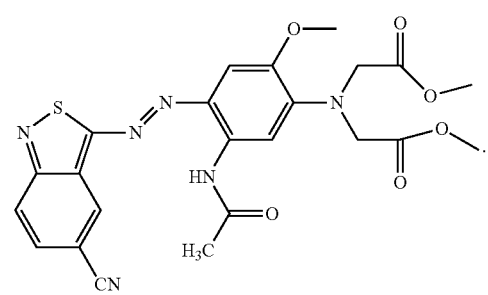
Even more preferred is a dye mixture, wherein the at least one dye of structure (III) is selected from the group consisting of: III-1 and III-2.
A dye mixture is preferred, wherein at least one dye of formula (IV) is present and wherein the one or more dye(s) of formula (IV) is/are selected from the group consisting of:
(IV-1)
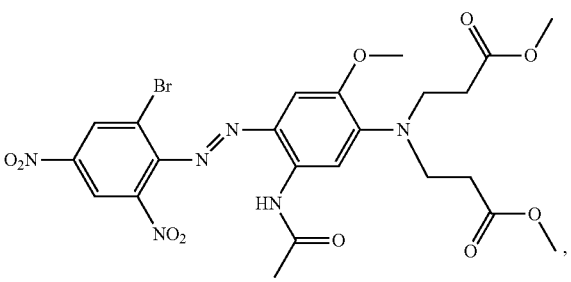
(IV-2)
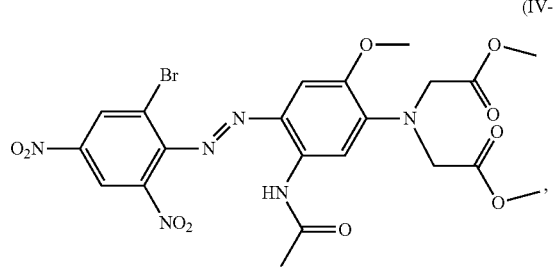
(IV-3)
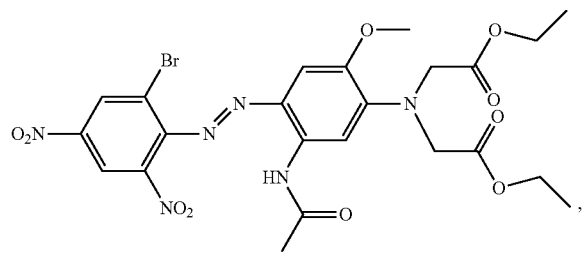
(IV-4)
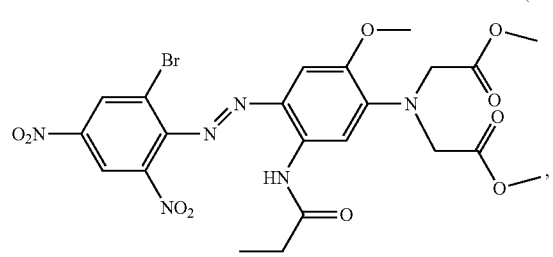
(IV-5)
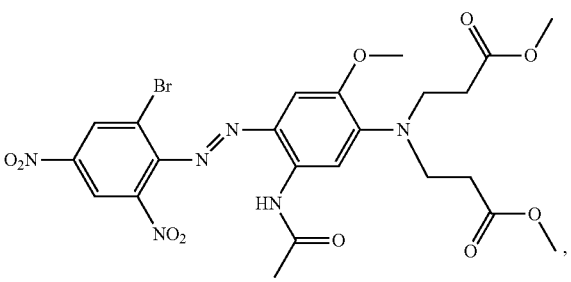
(IV-6)
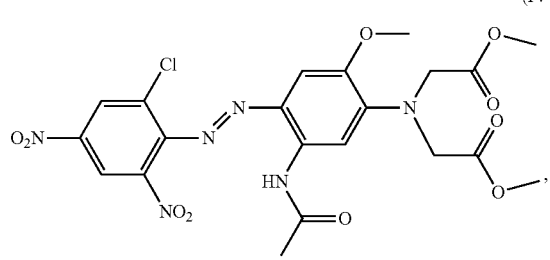
(IV-7)
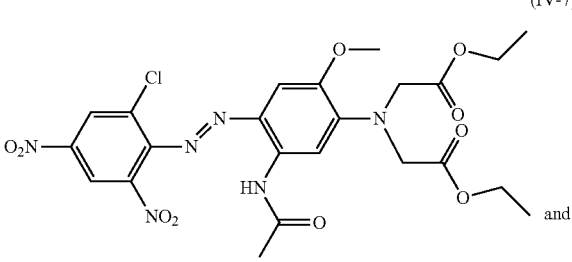
and

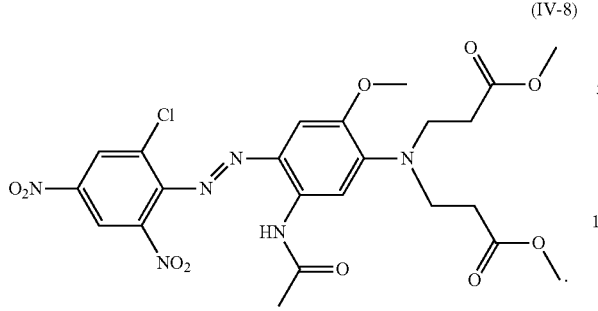

Even more preferred is a dye mixture, wherein the at least one dye of structure (IV) is selected from the group consisting of: IV-1, IV-2, IV-3 and IV-7, Based on these preferred single dyes advantageous mixtures can be obtained and a particularly preferred mixture is a dye mixture comprising
one dye of formula (I-1)

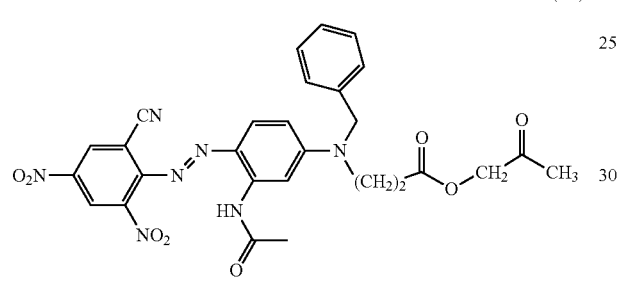

and one dye of formula (II-1)

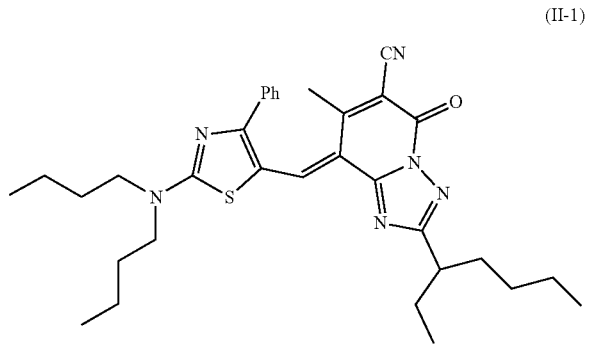 [SMILES: CCCCC(CC)c1nc2/c(=C/c3sc(N(CCCC)CCCC)nc3-c3ccccc3)c(C)c(C#N)c(=O)n2n1]

and optionally
one dye of formula (III-1) and/or one dye of formula (IV-1)

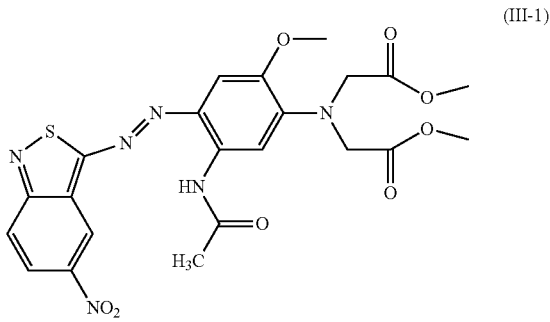

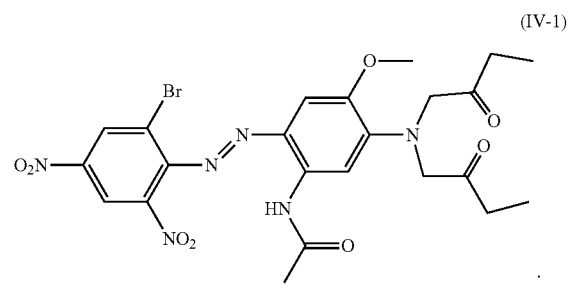

Another particularly preferred embodiment of the present invention is a dye mixture comprising one dye of formula (I-2)

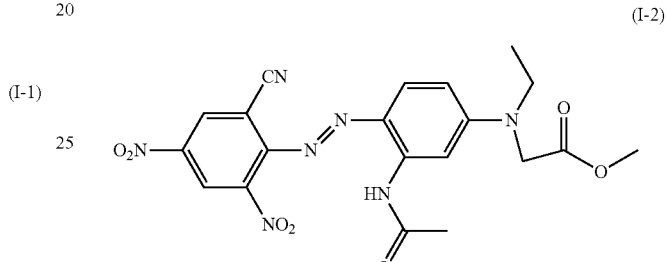

and one dye of formula (II-1)

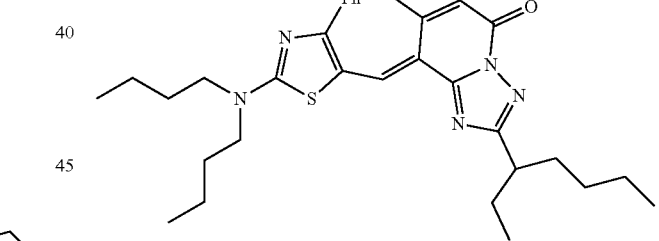

and optionally
one dye of formula (III-1) and/or one dye of formula (IV-1)

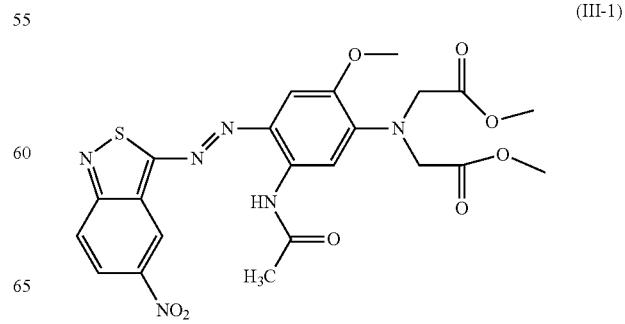

-continued

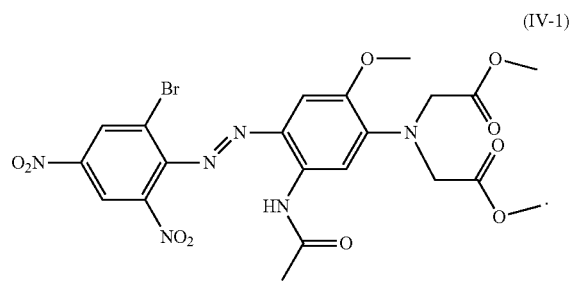
(IV-1)

Yet another particularly preferred embodiment of the present invention is a dye mixture comprising one or more dye(s) of formula (I-a)

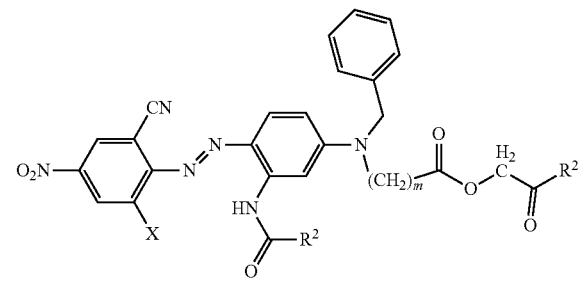
(I-a)

and one dye of formula (II-1)

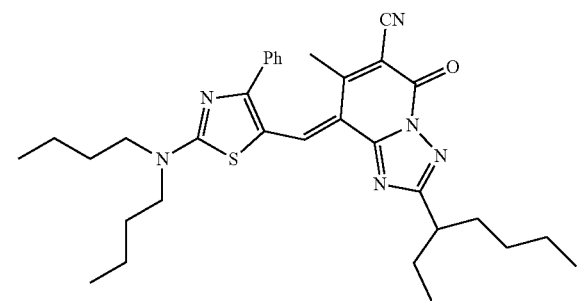
(II-1)

and one or more dye(s) of formula (IV)

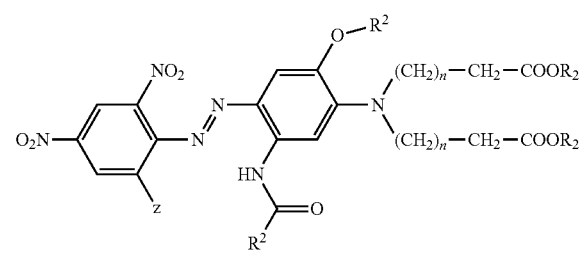
(IV)

and optionally one or more dye(s) of formula (III)

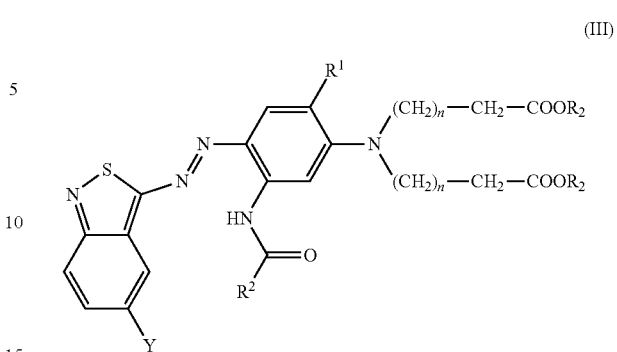
(III)

wherein independently of each other
$R^1$ is hydrogen or $(C_1\text{-}C_2)$-alkoxy,
$R^2$ is $(C_1\text{-}C_2)$-alkyl,
X is $NO_2$ or CN,
Y is $NO_2$ or CN,
z is Cl or Br,
n is 0 or 1 and
m is 1 or 2.

Ranges (in weight % of the total amount of dyes in the dye mixture) of the components of the inventive dye mixtures are:
(I): 1 to 99
(II): 1 to 99
(III): 0 to 30
(IV): 0 to 75.

Preferred are ranges in weight %:
(I): 2 to 60
(II): 2 to 40
(III): 0 to 30
(IV): 0 to 75, Preferred are ranges in weight %:
(I): 10 to 50
(II): 3 to 50
(III): 0 to 30
(IV): 0 to 75.

For mixtures comprising at least one dye of structure (III) the ranges preferably are:
(I): 7 to 60
(II): 2 to 40
(III): 5 to 30
(IV): 0 to 75,
more preferably:
(I): 10 to 50
(II): 3 to 30
(III): 10 to 30
(IV): 0 to 75.

And for mixtures comprising at as one dye of structure (IV) the ranges preferably are:
(I): 7 to 50
(II): 2 to 30
(III): 0 to 30
(IV): 20 to 75,
more preferably:
(I): 10 to 40
(II): 3 to 20
(III): 0 to 30
(IV): 40 to 75.

Mixtures comprising both, at least one dye of structure (III) and at least one dye of structure (IV), preferably have the following composition:
(I): 10 to 40
(II): 3 to 20
(III): 10 to 20
(IV): 40 to 75.

The single dyes of the inventive dye mixtures are known and can be prepared according to known procedures, for example from the documents: EP 0 167 913, DE 26 10 675, DE 29 36 489 and EP 0 591 736.

In each dye mixture the components I to IV add up to 100% in case the dye mixture consists of the dyes mentioned above or to less than 100% in case additional dyes are added e.g. as shading components. In such a case the amount of shading components preferably is less than 10, more preferred less than 5 and most preferred less than 2 weight % based on the weight of all dyes of the dye mixture.

The dye mixture(s) of the present invention can be obtained by mixing the single dyes. Thus also a process for the production of a dye mixture as described above comprising
a) mixing the components of the dye mixture,
b) homogenizing the mixture obtained in step a)
forms an aspect of the present invention.

In general there are three preferred possibilities:
1)
a) mixing the required components of formulae (I) to (IV) with dispersing agent,
b) homogenizing and milling the mixture obtained in step a),
c) spray drying the milled mixture obtained in step b).
2)
Alternatively all single components (I) to (IV) can be treated as described above under 1) a) to c)
and the formulated components of formulae (I) to (IV) of the respective steps c) can then be mixed as dry components.
3)
As another alternative a combination of both processes is possible wherein the main components of formulae (I) to (IV) are treated according to process 1) a) and b) and minor components of formulae (I) to (IV) can be added as dry powder treated according to process 2) a) b) and c) to the shiny of the main components and the resulting total mix is then spray dried.

A process for dyeing or printing carboxamido- and/or hydroxyl-containing material, comprising contacting the carboxamido- and/or hydroxyl-containing material with a dye mixture as described below and/or an aqueous solution as described above forms yet another aspect of the present invention.

When the dye mixture of the present invention is used in dyeing, the dye mixture is dispersed in an aqueous medium by means of a dispersing agent and wetting agent in the usual way to prepare a dye bath for dyeing or a printing paste for textile printing.

Typical examples of a dispersing agent are: lignolinsulphonates, naphthalene sulphonic acid/formaldehyde condensates and phenol/cresol/sulphanilic acid/formaldehyde condensates, typical examples of wetting agents are: alkyl aryl ethoxylates which may be sulphonated or phosphated and typical examples of other ingredients which may be present are: inorganic salts, de-dusting agents such as mineral oil or nonanol, organic liquids and buffers. Dispersing agents may be present in amounts of 30 to 500% based on the weight of the dye mixture. Dedusting agents may be used in amounts from 0 to 5% based on the weight of the dye mixture.

In the case of dyeing e.g. polyester fibres and fibre mixture products such as blended yarn fabrics of union cloth products comprising polyester fibres those fibres and/or fibre mixture products can be dyed with good colour fastness by common dyeing methods, such as the high temperature dyeing method, the carrier dyeing method and the thermosol dyeing method. In some cases, the addition of an acid substance to the dye bath may lead to more successful dyeing.

Suitable process conditions may advantageously be selected from the following
(i) exhaust dyeing at a pH of from 4 to 8.5, at a temperature of from 125 to 140° C. for from 10 to 120 minutes and under a pressure of from 1 to 2 bar, a sequestrant optionally being added;
(ii) continuous dyeing at a pH of from 4 to 8.5, at a temperature of from 190 to 225° C. for from 15 seconds to 5 minutes, a migration inhibitor optionally being added;
(iii) direct printing at a pH of from 4 to 6.5, at a temperature of from 160 to 185° C. for from 4 to 15 minutes for high temperature steaming, or at a temperature of from 190 to 225° C. for from 15 seconds to 5 minutes for bake fixation with dry heat or at a temperature of from 120 to 140° C. and 1 to 2 bar for from 10 to 45 minutes for pressure steaming, wetting agents and thickeners (such as alginates) of from 5 to 100% by weight based on the weight of the dye mixture optionally being added;
(iv) discharge printing (by padding the dye mixture on to the textile material, drying and overprinting) at a pH of from 4 to 6.5, migration inhibitors and thickeners optionally being added;
(v) carrier dyeing at a pH of from 4 to 7.5, at a temperature of from 95 to 100° C. using a carrier such as methylnaphthalene, diphenylamine or 2-phenylphenol, sequestrants optionally being added; and
(vi) atmospheric dyeing of acetate, triacetate and nylon at a pH of from 4 to 7.5, at a temperature of about 85° C. for acetate or at a temperature of about 90° C. for triacetate and nylon for from 15 to 90 minutes, sequestrants optionally being added.

In all the above processes, the dye mixture is applied as a dispersion comprising from 0.001 to 20%, preferably from 0.005 to 16%, of the dye mixture in an aqueous medium.

An aqueous solution for dying comprising a dye mixture as described above forms another aspect of the present invention.

In addition to the above-mentioned application processes, the dye mixture may be applied to synthetic textile materials and fibre blends by ink-jet printing, the substrates optionally having been pre-treated to aid printing. For ink-jet applications, the application medium may comprise water and a water-soluble organic solvent, preferably in a weight ratio of from 1:99 to 99:1, more preferably from 1:95 to 2:1 and especially in the range 1:90 to 1:1. The water-soluble organic solvent preferably comprises a $C_1$-$C_4$-alkanol, especially methanol or ethanol, a ketone, especially acetone or methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

Thus an ink for digital textile printing, comprising a dye mixture as described above forms another aspect of the present invention.

The inventive dye mixture may also be applied to textile materials using supercritical carbon dioxide, in which case the dye formulating agents may optionally be omitted.

Another aspect of the present invention is the use of a dye mixture as described above and/or an aqueous solution as described above for dying fibres, as well as blends of such fibres selected from the group consisting of: synthetic fibres: nylon, nylon-6, nylon-6.6 and aramid fibres, vegetable fibres, seed fibres, cotton, organic cotton, kapok, coir from coconut husk; bast fibres, flax, hemp, jute, kenaf, ramie, rattan; leaf fibres, sisal, henequen, banana; stalk fibres, bamboo; fibres from animals, wool, organic wool, silk, cashmere wool, alpaca fibre, mohair, Angora fibre as well as fur and leather materials; manufactured, regenerated and recycled fibres, cellulosic fibres; paper fibres, cellulosic regenerated fibres, viscose rayon fibres, acetate and triacetate fibres and Lyocell fibres.

Accordingly fibre and blends containing such fibre selected from the group consisting of: synthetic fibre materials, nylon materials, nylon-6, nylon-6.6 and aramid fibres, vegetable fibres, seed fibres, cotton, organic cotton, kapok, coir from coconut husk; bast fibres, flax, hemp, jute, kenaf, ramie, rattan; leaf fibres, sisal, henequen, banana; stalk fibres, bamboo; fibres from animals, wool, organic wool, silk, cashmere wool, alpaca fibre, mohair, Angora fibre as well as fur and leather materials; manufactured, regenerated and recycled fibres, cellulosic fibres; paper fibres, cellulosic regenerated fibres, viscose rayon fibres, acetate and triacetate fibres, and Lyocell fibres comprising a dye mixture as described above in physically bound form is another aspect of the present invention.

An especially preferred textile material for being dyed with the dye mixture of the present invention is an aromatic polyester or fibre blend thereof with fibres of any of the above mentioned fibre or blend materials. Especially preferred fibre blends include those of polyester-cellulose, such as polyester-cotton, and polyester-wool. The textile materials or blends thereof may be in the form of filaments, loose fibres, yarn or woven or knitted fabrics.

Particularly, among polyester fibres, not only ordinary polyester fibres (regular denier fibres) but also microfibers (fine denier fibres, which are less than 0.6 denier) are to be mentioned as fibres, which can successfully be dyed with the dye mixture of the present invention.

The following examples shall further illustrate the invention, without limiting the scope. Parts and percentages are by weight unless noted otherwise. The relationship of parts by weight to parts by volume is that of the kilogram to the liter.

EXAMPLE 1

Synthesis of dyes of formula I-1 and II-1 were carried out using methods similar to those described in DE4403083 and EP07821369, To facilitate application, dye powders were prepared by glass bead milling of 47.4 parts of the isolated dye after synthesis with 47.4 parts of Reax 85A (a lignin sulphonate dispersing agent) and 0.5 parts sulphuric acid (to pH 6). After milling to a suitable particle size range, 0.5 parts of Mobile Anti Dust Concentrate (a mineral based oil dedusting agent) were added and the dispersions were spray dried to produce powders with 4.2 parts residual moisture.

A dyeing liquor was prepared by adding 1.19 g. of a powder containing dye of formula I-1 and 0.51 g. of a powder containing dye of formula II-1 to 1000 ml of deionized water followed by mechanical mixing. A 5 g piece of 100% polyester material was dyed in 50 ml of the dye liquor after adjusting to pH 4.5 with Sodium Acetate and Acetic acid. After dyeing at 130° C. for 60 minutes, followed by rinsing, reduction clearing and drying, a bright blue shade was achieved.

EXAMPLE 2

Synthesis of dyes of formula I-2, II-1 and IV-2 was carried out using methods similar to those described in DE4403083, EP07821369, JP58038754, JP51150530

To facilitate application, dye powders were prepared as described in Example 1.

A dyeing liquor was prepared by adding 0.68 g of a powder containing dye of formula I-2 and 0.17 g of a powder containing dye of formula II-1 and 0.85 g of a powder containing dye of formula IV-2 to 1000 ml of deionized water followed by mechanical mixing. A 5 g piece of 100% polyester material was dyed in 50 ml of the dye liquor after adjusting to pH 4.5 with Sodium. Acetate and Acetic acid. After dyeing at 130° C. for 60 minutes, followed by rinsing, reduction clearing and drying, a bright Navy blue shade was achieved.

All examples of the following table are prepared as formulations as explained above, using dispersing- and dedusting agents.

| Example | Dye (a) | % | Dye (b) | % | Dye (c) | % | Dye (d) | % |
|---|---|---|---|---|---|---|---|---|
| 3 | I-1 | 80 | II-1 | 20 | | | | |
| 4 | I-1 | 60 | II-1 | 40 | | | | |
| 5 | I-1 | 50 | II-1 | 50 | | | | |
| 6 | I-1 | 30 | II-1 | 70 | | | | |
| 7 | I-2 | 80 | II-1 | 20 | | | | |
| 8 | I-11 | 75 | II-1 | 25 | | | | |
| 9 | I-2 | 70 | II-1 | 30 | | | | |
| 10 | I-2 | 60 | II-1 | 40 | | | | |
| 11 | I-2 | 50 | II-1 | 50 | | | | |
| 12 | I-2 | 30 | II-1 | 70 | | | | |
| 13 | I-2 | 70 | II-1 | 15 | IIA-1 | 15 | | |
| 14 | I-2 | 60 | II-1 | 20 | IIA-1 | 20 | | |
| 15 | I-1 | 40 | II-1 | 30 | III-1 | 30 | | |
| 16 | I-1 | 70 | II-1 | 10 | III-1 | 20 | | |
| 17 | I-1 | 40 | II-1 | 10 | IV-1 | 50 | | |
| 18 | I-1 | 20 | II-1 | 5 | IV-1 | 75 | | |
| 19 | I-1 | 15 | II-1 | 5 | IV-1 | 80 | | |
| 20 | I-1 | 40 | II-1 | 10 | IV-2 | 50 | | |
| 21 | I-1 | 20 | II-1 | 5 | IV-2 | 75 | | |
| 22 | I-1 | 15 | II-1 | 5 | IV-2 | 80 | | |
| 23 | I-1 | 20 | II-1 | 10 | III-1 | 20 | IV-1 | 50 |
| 24 | I-1 | 10 | II-1 | 3 | III-1 | 17 | IV-1 | 70 |
| 25 | I-1 | 15 | II-1 | 5 | III-1 | 20 | IV-1 | 60 |
| 26 | I-1 | 10 | II-1 | 3 | III-1 | 17 | IV-2 | 70 |
| 27 | I-2 | 40 | II-1 | 30 | III-1 | 30 | | |
| 28 | I-2 | 70 | II-1 | 10 | III-1 | 20 | | |
| 29 | I-2 | 40 | II-1 | 10 | IV-1 | 50 | | |
| 30 | I-2 | 20 | II-1 | 5 | IV-1 | 75 | | |

| Example | Dye (a) | % | Dye (b) | % | Dye (c) | % | Dye (d) | % |
|---|---|---|---|---|---|---|---|---|
| 31 | I-2 | 15 | II-1 | 5 | IV-1 | 80 | | |
| 32 | I-2 | 40 | II-1 | 10 | IV-2 | 50 | | |
| 33 | I-2 | 20 | II-1 | 5 | IV-2 | 75 | | |
| 34 | I-2 | 15 | II-1 | 5 | IV-2 | 80 | | |
| 35 | I-2 | 20 | II-1 | 10 | III-1 | 20 | IV-1 | 50 |
| 36 | I-2 | 10 | II-1 | 3 | III-1 | 17 | IV-1 | 70 |
| 37 | I-2 | 15 | II-1 | 5 | III-1 | 20 | IV-1 | 60 |
| 38 | I-2 | 10 | II-1 | 3 | III-1 | 17 | IV-2 | 70 |

The invention claimed is:

1. A process for dyeing a polyester material comprising contacting the polyester material with a dye mixture in a concentration of 1.0 to 2.0% by weight and wherein the dye mixture consists essentially of 10 to 50% by weight of a dye formula (I-a)

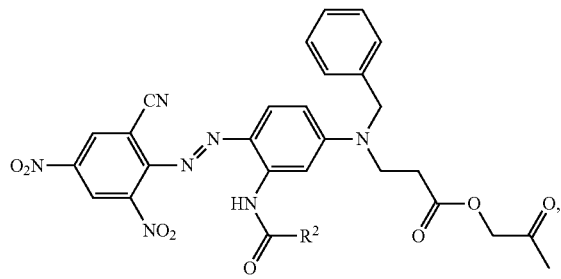

(I-a)

15 to 30% by weight of a dye of the formula (II-1)

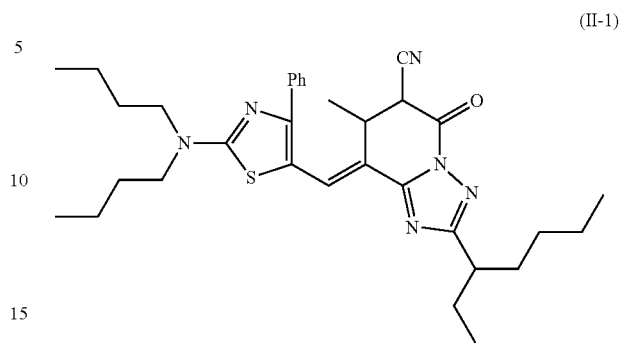

(II-1)

and 20 to 75% by weight of a dye of the formula (IV)

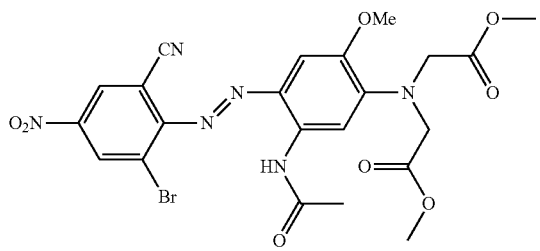

(IV)

* * * * *